(12) United States Patent
Howell et al.

(10) Patent No.: US 7,195,271 B2
(45) Date of Patent: Mar. 27, 2007

(54) PINCH-RESISTANT HITCH ASSEMBLY AND CHILDREN'S RIDE-ON VEHICLE ASSEMBLIES INCLUDING THE SAME

(75) Inventors: William R. Howell, Chaffee, NY (US); Gary G. Lenihan, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 334 days.

(21) Appl. No.: 10/966,940

(22) Filed: Oct. 15, 2004

(65) Prior Publication Data

US 2006/0038380 A1 Feb. 23, 2006

Related U.S. Application Data

(60) Provisional application No. 60/589,267, filed on Jul. 19, 2004.

(51) Int. Cl.
*B60D 1/00* (2006.01)

(52) U.S. Cl. .................. 280/504; 446/434; 280/432

(58) Field of Classification Search ............. 280/504, 280/432; 180/65.1; 446/434
See application file for complete search history.

(56) References Cited

U.S. PATENT DOCUMENTS

| | | | |
|---|---|---|---|
| 2,201,910 A | 5/1940 | Meienborn | |
| 2,233,116 A | 2/1941 | Voorheis | |
| 2,493,874 A | 1/1950 | Hume | |
| 2,602,266 A | 7/1952 | Preston | |
| 3,305,246 A | 2/1967 | Gonczy et al. | |
| 3,733,090 A | 5/1973 | Keller | |
| 3,822,501 A | 7/1974 | Kelterstr. | |
| 3,947,839 A | 3/1976 | Zigmant | |
| 3,964,767 A | 6/1976 | Williams | |

(Continued)

FOREIGN PATENT DOCUMENTS

DE 3700947 A1 7/1988

(Continued)

OTHER PUBLICATIONS

Estes, Bill, "PullRite: The Ultimate Sway Control," Trailer Life, Dec. 1989.

(Continued)

*Primary Examiner*—Tony Winner
(74) *Attorney, Agent, or Firm*—Kolisch Hartwell, P.C.

(57) ABSTRACT

Children's ride-on vehicle assemblies that include a leading vehicle, a trailing vehicle, and a connection apparatus, such as a hitch assembly, that selectively interconnects the leading and trailing vehicles. At least the leading vehicle includes a drive assembly adapted to propel the vehicle along a ground surface. In some embodiments, at least the leading vehicle is a battery-powered ride-on vehicle. The hitch assembly is adapted to interconnect the leading and trailing vehicles and to provide a limited range of pivoting of the vehicles relative to each other. In some embodiments, the hitch assembly includes a pinch-relief mechanism that is adapted to provide at least a predetermined clearance between the vehicles. In some embodiments, the hitch assembly is adapted to provide limited pivotal ranges in at least two planes. In some embodiments, the hitch assembly is adapted to selectively uncouple and recouple the vehicles from and to each other.

41 Claims, 6 Drawing Sheets

U.S. PATENT DOCUMENTS

| | | |
|---|---|---|
| 4,025,085 A | 5/1977 | Jacobs |
| 4,040,006 A | 8/1977 | Kimmel |
| 4,122,390 A | 10/1978 | Kollitz et al. |
| 4,204,700 A | 5/1980 | Haines, Sr. |
| 4,211,428 A | 7/1980 | Barcus |
| 4,232,910 A | 11/1980 | Snyder |
| 4,254,998 A | 3/1981 | Marshall et al. |
| 4,304,066 A | 12/1981 | Brand et al. |
| 4,366,645 A | 1/1983 | Crain et al. |
| 4,372,075 A | 2/1983 | Harkins |
| 4,512,483 A | 4/1985 | Crossley et al. |
| 4,516,948 A | 5/1985 | Obara |
| 4,556,232 A | 12/1985 | Sever |
| 4,558,263 A | 12/1985 | Harris et al. |
| 4,562,893 A * | 1/1986 | Cunard .................... 180/6.5 |
| 4,617,001 A | 10/1986 | Parein |
| 4,627,633 A | 12/1986 | Gehman et al. |
| 4,700,966 A | 10/1987 | Hawkins et al. |
| 4,708,683 A | 11/1987 | Lehmann et al. |
| 4,824,135 A | 4/1989 | McGregor |
| 5,209,693 A | 5/1993 | Lyman |
| 5,232,271 A | 8/1993 | Cobble et al. |
| 5,421,600 A | 6/1995 | Jones et al. |
| 5,558,351 A | 9/1996 | Hunter |
| 5,644,114 A | 7/1997 | Neaves |
| 5,859,509 A | 1/1999 | Bienz et al. |
| 5,924,910 A | 7/1999 | Liu |
| 6,179,331 B1 * | 1/2001 | Jones et al. .................. 280/827 |
| 6,292,094 B1 | 9/2001 | Deng et al. |
| 6,672,936 B1 | 1/2004 | Shaffer |
| 6,771,034 B2 | 8/2004 | Reile et al. |
| 6,786,795 B1 * | 9/2004 | Mullaney et al. ........... 446/431 |
| 6,827,164 B2 * | 12/2004 | Palumbo et al. ........... 180/65.1 |
| 6,860,512 B2 * | 3/2005 | Lawson, Jr. ................. 280/781 |
| 2002/0158442 A1 * | 10/2002 | Harrington ................. 280/400 |

FOREIGN PATENT DOCUMENTS

| | | |
|---|---|---|
| DE | 29701360 U1 | 4/1997 |
| EP | 0044148 A1 | 1/1982 |

OTHER PUBLICATIONS

"The PullRite Principle," Pulliam Enterprises, Inc., www.pullrite.com Web site, 1996.

"70 Degree PullRite," "90 Degree PullRite," and "Camper Special," www.pullrite.com Web site, 2004.

* cited by examiner

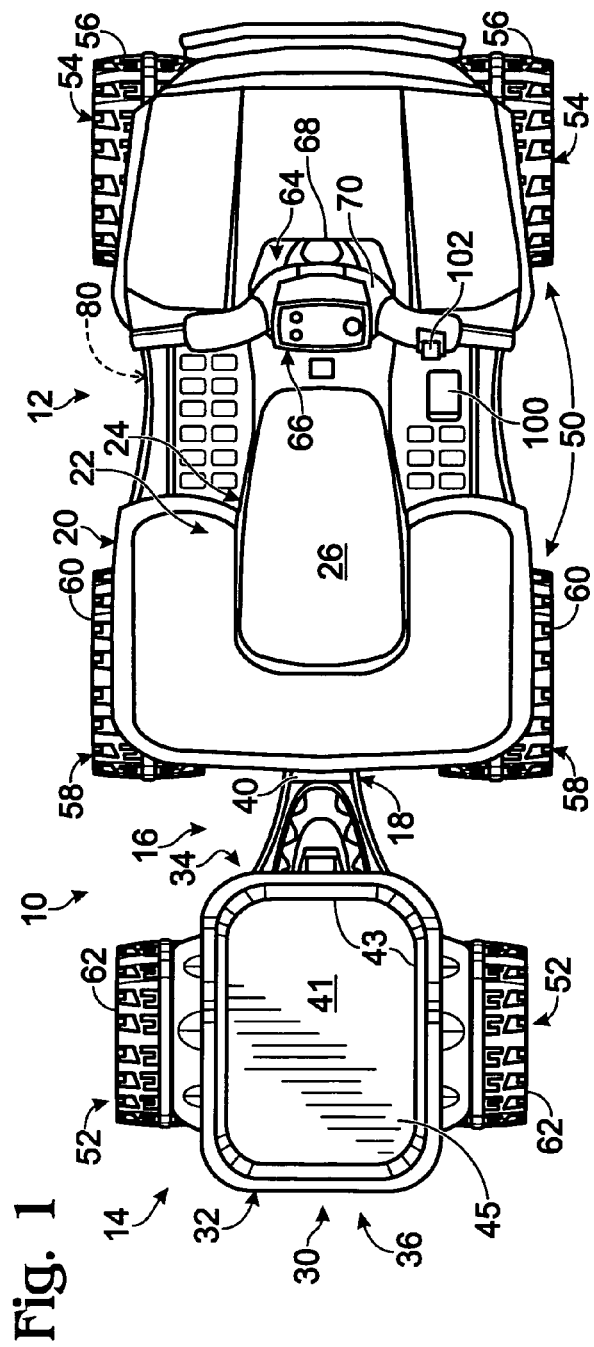
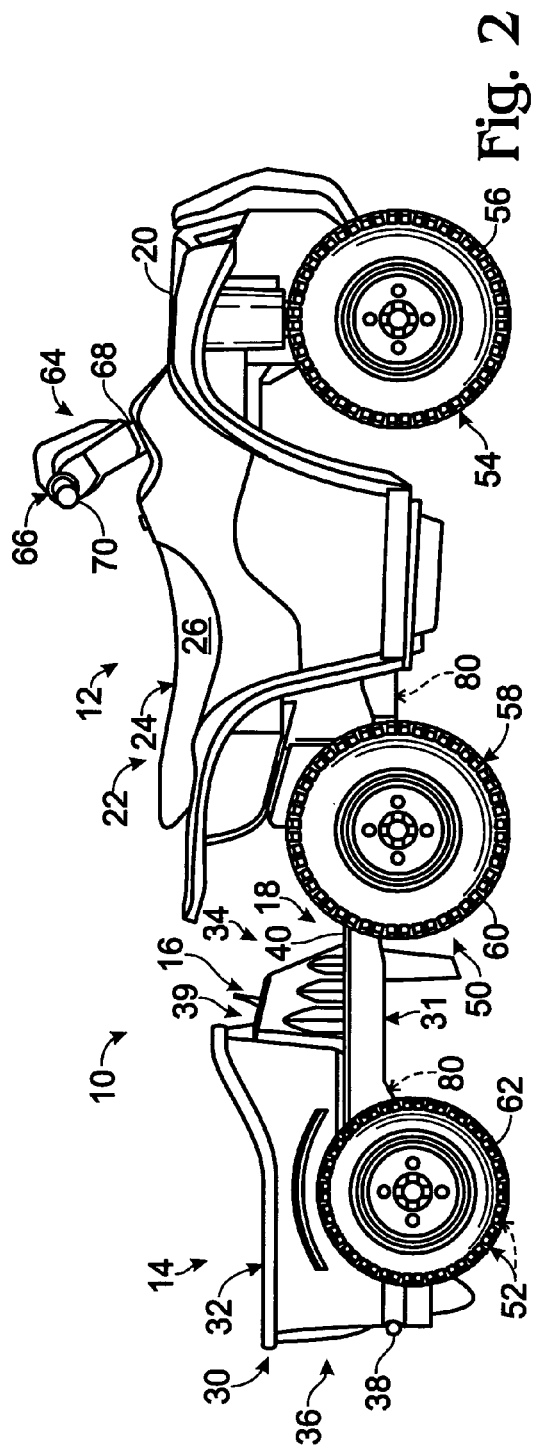
Fig. 1
Fig. 2

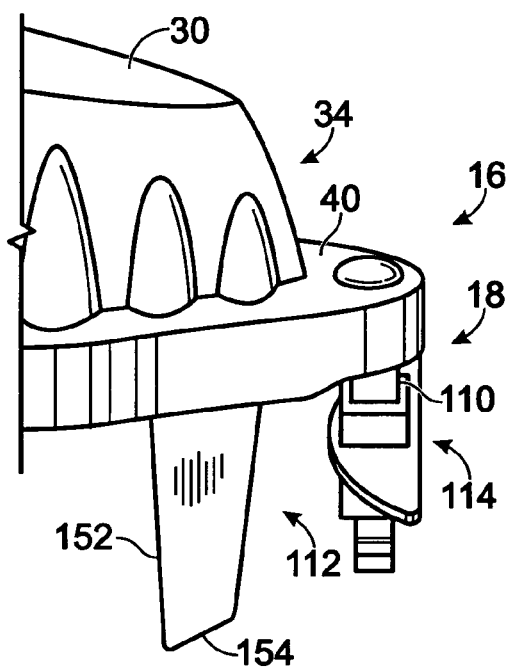
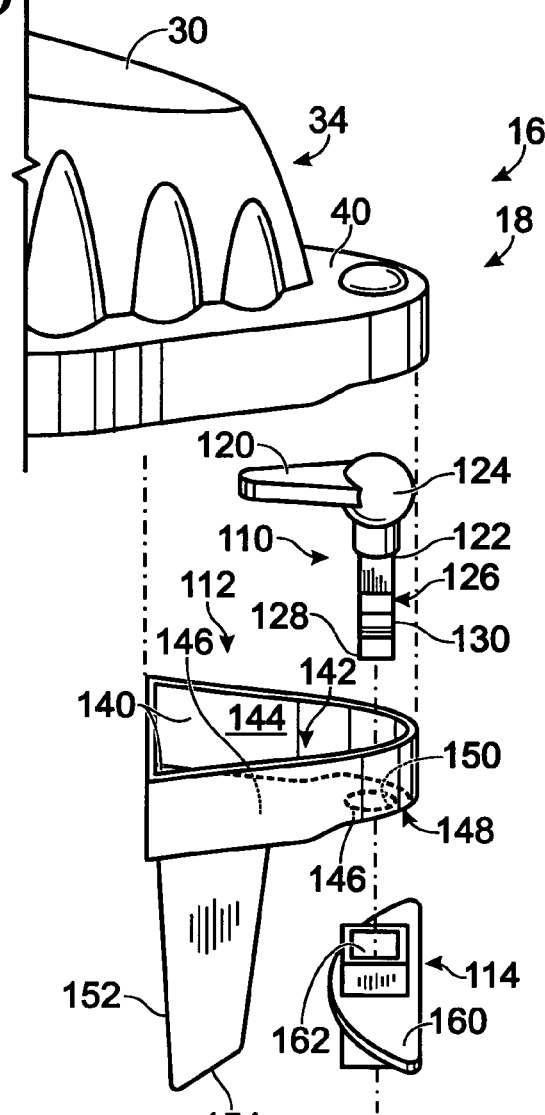
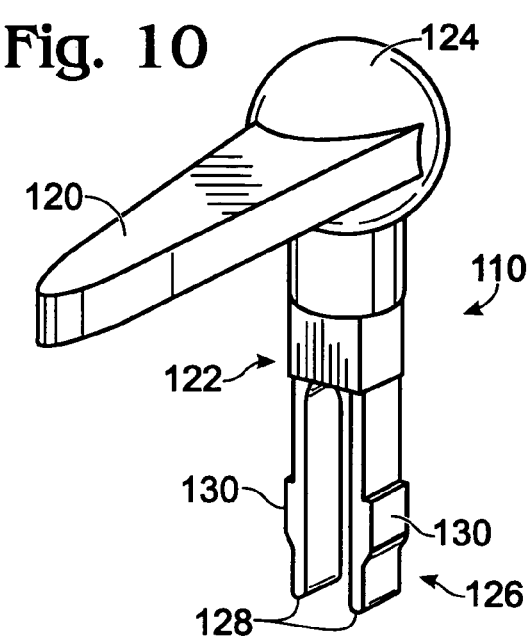

PINCH-RESISTANT HITCH ASSEMBLY AND CHILDREN'S RIDE-ON VEHICLE ASSEMBLIES INCLUDING THE SAME

RELATED APPLICATION

This application claims priority to U.S. Provisional Patent Application Ser. No. 60/589,267, which was filed on Jul. 19, 2004, and the complete disclosure of which is hereby incorporated by reference for all purposes.

TECHNICAL FIELD

The present disclosure relates generally to children's ride-on vehicles, and more particularly to children's ride-on vehicle assemblies having a leading vehicle, a trailing vehicle, and a hitch assembly interconnecting the leading and trailing vehicle.

BACKGROUND

Children's ride-on vehicles are reduced-scale vehicles that are designed and sized for use by children. The vehicles are typically wheeled vehicles, with at least one wheel that is adapted to be steered responsive to steering inputs, such as via a steering assembly with a steering mechanism positioned for use by a child sitting on the vehicle's seat. The vehicles also include a drive assembly that is adapted to propel the vehicle along a ground surface. The vehicles may be motorized vehicles, in which case the drive assembly includes one or more battery-powered motors that are adapted to drive the rotation of at least one driven wheel.

SUMMARY

The present disclosure is directed to children's ride-on vehicle assemblies that include a leading vehicle, a trailing vehicle, and a connection apparatus, such as a hitch assembly, that selectively interconnects the leading and trailing vehicles. The leading and trailing vehicles are wheeled vehicles, which include at least one wheel, and which typically include a plurality of wheels. At least the leading vehicle includes a seat that is sized for a child and a drive assembly adapted to propel the vehicle along a ground surface. One or both of the vehicles may include a steering assembly that is adapted to steer the vehicle. In some embodiments, at least the leading vehicle is a battery-powered ride-on vehicle with a drive assembly that includes at least one battery-powered motor adapted to drive the rotation of one or more of the vehicle's wheels. The hitch assembly is adapted to interconnect the leading and trailing vehicles and to provide a limited range of pivoting of the vehicles relative to each other. In some embodiments, the hitch assembly includes a pinch-relief mechanism that is adapted to provide at least a predetermined clearance between the vehicles. In some embodiments, the hitch assembly is adapted to provide limited ranges of pivoting of the vehicles relative to each other in at least two planes. In some embodiments, the hitch assembly is adapted to selectively uncouple and recouple the vehicles from and to each other.

BRIEF DESCRIPTION OF THE DRAWINGS

FIG. 1 is a top plan view of a children's ride-on vehicle assembly having a leading vehicle and a trailing vehicle.

FIG. 2 is a side elevation view of the children's ride-on vehicle assembly of FIG. 1.

FIG. 8 is an isometric view of an illustrative hitch assembly suitable for use with children's ride-on vehicle assemblies according to the present disclosure.

FIG. 9 is an exploded isometric view of the hitch assembly of FIG. 8, showing individual components of the hitch assembly including a hitch member, a housing, and a receiving member.

FIG. 10 is an isometric view of the hitch member of FIG. 8.

DETAILED DESCRIPTION AND BEST MODE OF THE DISCLOSURE

Figure 3:
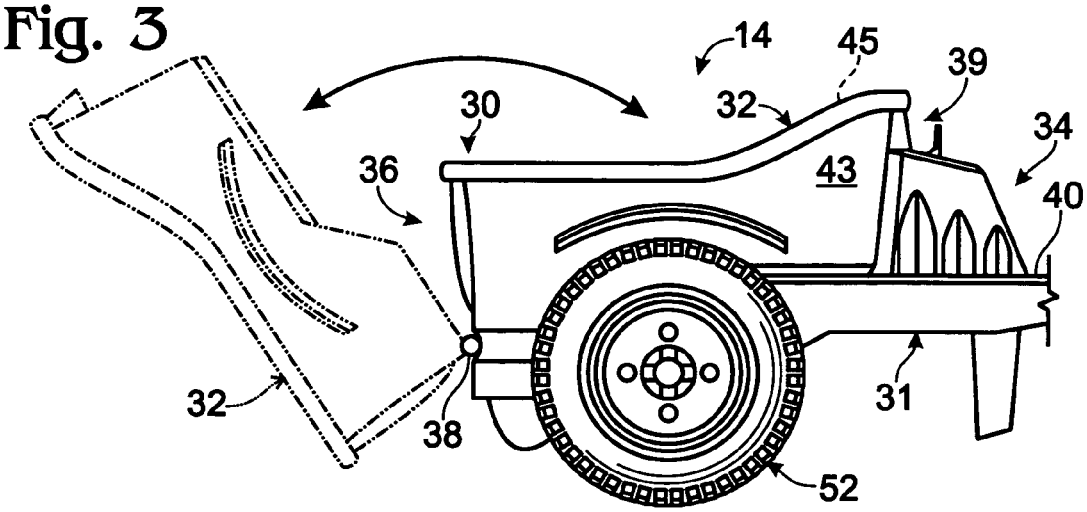
FIG. 3 is a side elevation view of the trailing vehicle of the children's ride-on vehicle assembly of FIG. 1, showing pivotal movement of a bed portion relative to a frame, or chassis, of the trailing vehicle body.

An illustrative example of a children's ride-on vehicle assembly is shown in FIGS. 1 and 2, and is indicated generally at 10. Ride-on vehicle assembly 10 includes a leading vehicle 12. Unlike conventional children's ride-on vehicles, which consist only of an independently operable ride-on vehicle, vehicle assembly 10 further includes a trailing, or towed, vehicle 14. Both the leading and trailing vehicles are reduced-scale vehicles that are sized and designed for use by children. Typically, at least substantial portions of each vehicle will be formed from molded plastic, although it is within the scope of the present disclosure that any suitable material, or combination of materials, may be used.

Vehicle assembly 10 further includes a connection apparatus 16 that is adapted to couple, link, or otherwise connect the trailing vehicle to the leading vehicle. As discussed in more detail herein, the connection apparatus may enable relative, such as pivotal, movement of the leading and trailing vehicles in at least one plane. The connection apparatus illustrated herein takes the form of a hitch assembly 18 that is configured to selectively couple the leading and trailing vehicles together, and to selectively permit the vehicles to be uncoupled, or disconnected, from each other. The connection assembly thus may be described as being in a coupled configuration when the trailing vehicle is coupled to the leading vehicle and in an uncoupled configuration when the trailing vehicle is not coupled to the leading vehicle.

As shown in FIGS. 1 and 2, leading vehicle 12 includes a leading vehicle body, or frame, 20 that defines, or includes, a passenger region 22 that is configured for at least a child driver. As shown, passenger region 22 includes a seat assembly 24 that is sized and configured to accommodate at least one child, such as the child driver. Seat assembly 24 may be integral with or otherwise mounted on leading vehicle body 20 and may have any suitable configuration, including configurations in which the position of the seat assembly is adjustable within the passenger compartment, and/or configurations in which the seat assembly includes two or more seats or two or more seating regions. Leading vehicle 12 may be sized for use either by a child driver or by a child driver and a child passenger. In the illustrated embodiment, seat assembly 24 includes a seat, or seating region, 26, that is sized and positioned to receive a child driver.

In the illustrated embodiments, leading vehicle 12 is shaped to generally resemble a reduced-scale all-terrain, or "quad," vehicle, and trailing vehicle 14 is shaped to resemble a trailer. However, children's ride-on vehicle assemblies according to the present disclosure may be shaped to generally resemble any type of vehicle or vehicles. Illustrative examples of leading vehicles include reduced-scale, or child-sized, vehicles that are shaped to resemble corresponding full-sized, or adult-sized, vehicles, such as cars, trucks, construction vehicles, emergency vehicles, off-road vehicles, motorcycles, trains, space vehicles, aircraft, watercraft and the like. It is also within the scope of the present disclosure that either or both of the vehicles in assembly 10 may be shaped to resemble fantasy vehicles that do not have a corresponding adult-sized counterpart. Further, although leading vehicle 12 is depicted in the form of a reduced-scale all-terrain vehicle, it will be appreciated that the components and/or features of vehicle assembly 10 may be configured for use on any type of children's ride-on vehicle.

Trailing vehicle 14 includes a trailing vehicle body 30 having a front end region 34 and a rear end region 36. In the illustrated embodiment, body 30 includes a frame, or chassis, 31 and a bed 32. In the illustrated example, front end region 34 includes a hitch assembly cover 40, which will be discussed in more detail subsequently. As shown in FIG. 2, the bed may be pivotal relative to the frame, with the pivotal connection formed by at least one hinge 38 or other pivotal linkage. As illustrated in FIG. 3, the bed may be adapted to pivot relative to the trailing vehicle chassis between a first position, in which the bed is supported by or otherwise retained against the chassis, such as shown in solid lines, and a second position, in which the bed is pivoted, or inclined, relative to the first position. This pivotal connection of the bed enables the trailing vehicle to be used as a dump vehicle, thereby adding play value to the vehicle assembly. For example, trailing vehicle body 30 may be adapted carry a child and/or assist in transportation of articles such as toys or similar cargo, as is appropriate for children. As perhaps best seen in FIG. 1, the illustrative example of bed 32 includes a bottom surface 41 and sidewalls 43 that extend around the perimeter of bottom surface 41. The bed may be described as defining a compartment 45 that is bounded by bottom surface 41 and sidewalls 43.

When bed 32 is pivotally coupled to the trailing vehicle's chassis, the trailing vehicle also may include a latch mechanism, which is schematically illustrated at 39, that selectively retains the bed in the first position, such as until a child manually releases the latch mechanism and pivots the bed away from the first position. As such, the latch mechanism may be described as preventing the pivoting of the bed away from the first position until the latch mechanism is released or otherwise disengaged. Latch mechanism 39 may take any suitable form, such as including a catch on a first one of the bed and the chassis, and a deflectable or repositionable detent on the other of the bed and the chassis. The latch mechanism may be, but is not required to be, biased to automatically engage, and thereby retain the bed in the first position, upon pivoting of the bed from a second position back to the first position.

Figure 5:
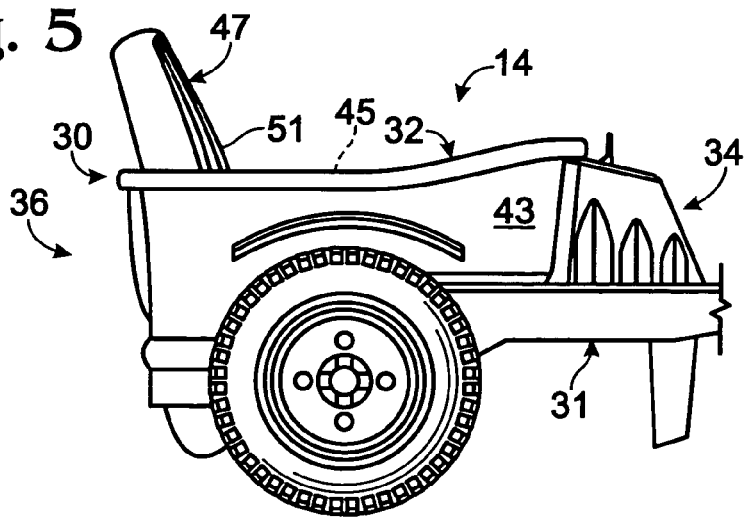
FIG. 5 is a side elevation view of another illustrative trailing vehicle that may be used with children's ride-on vehicle assemblies according to the present disclosure.
Figure 6:
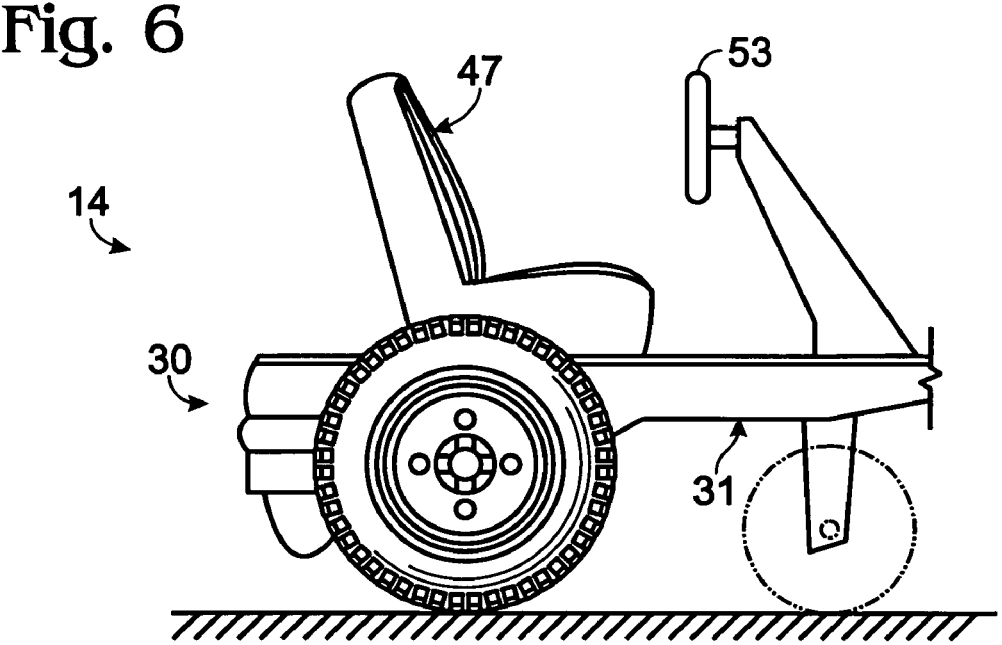
FIG. 6 is a side elevation view of another illustrative trailing vehicle that may be used with children's ride-on vehicle assemblies according to the present disclosure.

In the illustrated example of trailing vehicle 14 shown in FIGS. 1–3, the vehicle may be described as taking the general form of a trailer, wagon, or similar structure. It is within the scope of the present disclosure that the trailing vehicle may have any suitable functional and/or ornamental shape, such as to complement the leading vehicle, to add play value to the vehicle assembly, to be adapted to transport a child or specific type of article(s), etc. As further illustrative examples, the trailing vehicle may include a passenger region with at least one seat, storage compartments, and/or handlebars or other simulated or actual steering mechanisms. The trailing vehicle may resemble an independently operable ride-on or other vehicle, or, as discussed in more detail herein, may even be an independently operable children's ride-on vehicle, which may include any of the drive assemblies and/or steerable assemblies disclosed herein. Several of these illustrative configurations for trailing vehicle 14 are shown in FIGS. 4–6.

Figure 4:
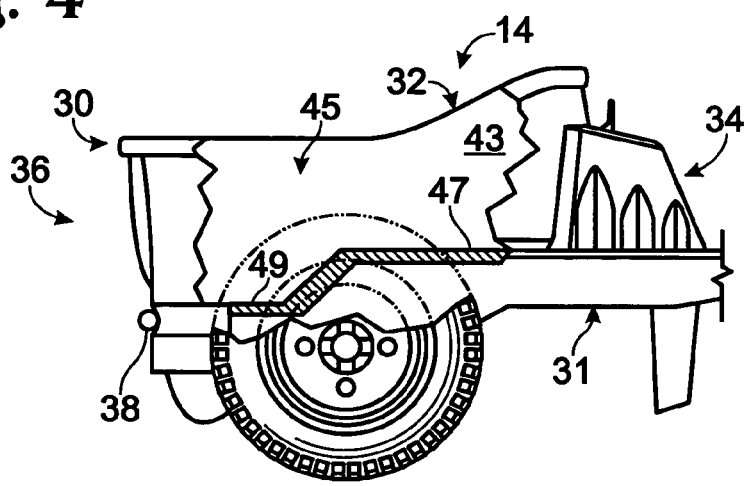
FIG. 4 is a partial cross-sectional side elevation view of another illustrative trailing vehicle that may be used with children's ride-on vehicle assemblies according to the present disclosure.

FIG. 4 illustrates a variation of the pivotal bed 32 shown in FIGS. 1–3. More particularly, FIG. 4 illustrates a pivotal bed 32 that defines a compartment 45 having a seat 47 and a footboard 49, which in the depicted example forms a surface that is positioned lower than the seat and configured to support a child's feet when the child is sitting on the seat. In FIG. 4, the bed is adapted so that the child passenger faces away from the leading vehicle when the child is sitting on the seat. It is within the scope of the present disclosure that other orientations, such as forward facing orientations may be used. A potential benefit of the rear-facing, rearward pivoting configuration shown in FIG. 4 is that the child's weight, when the child is sitting on seat 47, is primarily positioned forward of the trailing vehicle's axle (upon which its wheels are mounted) and away from hinge(s) 38. FIG. 5 illustrates an example of a trailing vehicle that includes a forward-facing seat 47 and which does not include a pivotal bed. In FIG. 5, seat 47 is shown including a back rest 51 that projects above the sidewalls of the bed.

As further variants, seat 47 may be omitted to provide a bed with a cargo compartment that is not pivotal relative to the chassis 31 of the trailing vehicle, at least one region or even all of the sidewalls may be partially or completely removed, and/or a seat and/or bed construction similar to FIG. 4 may be utilized. FIG. 6 illustrates an example of a trailing vehicle that includes a seat 47 and a body 30 that does not include a bed. Also shown in FIG. 6 is an optional steering mechanism 53, such as may be secured in a fixed orientation relative to the body to provide a hand rest for a child sitting on seat 47, may be rotatable to simulate the receipt of steering inputs, and/or which may even be coupled to a steerable wheel or wheels of the trailing vehicle to permit actual steering of the vehicle. Other simulated or actual steering mechanisms may be used in place of the illustrated (simulated or actual) steering mechanism 53, such as handlebars. FIG. 6 also demonstrates in dashed lines that the trailing vehicle may include at least one forward wheel and at least one rearward wheel, which enables the trailing vehicle to roll along a ground surface even if uncoupled from a leading vehicle. As discussed herein, at least one of these wheels may be steerable and/or driven, although it is also within the scope of the disclosure that the trailing vehicle includes only non-steerable, non-driven wheels.

It is within the scope of the present disclosure that vehicle assembly 10 may include more than one trailing vehicle. For example, in some embodiments, a leading vehicle may be adapted to tow more than one trailing vehicle, which may be collectively or sequentially coupled to the leading vehicle. Similarly, a trailing vehicle may itself include a connection assembly, such as any of the hitch assemblies described herein, which selectively enables another trailing vehicle to be coupled thereto.

As discussed above, vehicle assembly 10 further includes wheels, with each of the leading and the trailing vehicles including at least one wheel, and typically at least a pair of wheels, such as may be mounted on a common axle, or aligned axles. The wheels enable the vehicles to travel over a ground surface as the wheels are rotated. The wheels may be driven wheels, which are adapted to be rotationally driven by a drive assembly, steerable wheels, which are adapted to be pivoted or otherwise oriented to steer the ground-traveling path of the vehicle, or free wheels, which are neither positively driven nor steered. Instead, free wheels simply are rotatable, such as in response to ground-traveling movement caused by the driving rotation of a driven wheel. It is within the scope of the disclosure that a wheel is both a driven wheel and a steerable wheel, although this is not required. In many applications, it may be desirable and/or or more cost effective to have separate driven and steerable wheels.

To provide an illustrative, but not exclusive, example of a suitable wheel assembly, and with reference back to FIGS. 1 and 2, vehicle assembly 10 is indicated as including a set of wheels. As shown, a first plurality of wheels 50 are rotatably coupled to the leading vehicle 12, and a second plurality of wheels 52 are rotatably coupled to the trailing vehicle 14. The first plurality of wheels includes a steerable wheel assembly 54 containing at least one steerable wheel 56, and a driven wheel assembly 58 containing at least one driven wheel 60. In the illustrated example, a pair of steerable wheels and a pair of driven wheels are shown in the first plurality of wheels, but the number and configuration of these wheels may vary within the scope of the present disclosure. Similarly, the second plurality of wheels includes a pair of free wheels 62 in the illustrated example, but the number and configuration of these wheels also may vary within the scope of the present disclosure.

As indicated at 64 in FIGS. 1 and 2, at least the leading vehicle includes a steering assembly that is adapted to receive steering inputs and steer the steerable wheel assembly responsive to the received steering inputs. Any suitable structure may be used to receive steering inputs, such as from a child sitting on the vehicle's seat, and to steer the steerable wheel(s) responsive thereto. The steering inputs received from a child sitting on seat 26 may be referred to as user-imparted steering inputs. In FIGS. 1 and 2, steering assembly 64 is shown including a steering mechanism 66 that is interconnected to steerable wheels 56 via a steering column 68. In FIGS. 1 and 2, steering mechanism 66 takes the form of handlebars 70. However, it is within the scope of the present disclosure that other mechanisms may be used, such as a steering wheel or steering levers. As discussed, it is also within the scope of the present disclosure that the trailing vehicle also may include a steering assembly. However, when the trailing vehicle is not configured for selective use as an independently operable children's ride-on vehicle, it may be desirable to not include a functional steering assembly so that the trailing vehicle cannot receive steering inputs that counteract or otherwise impair steering inputs to the leading vehicle.

Figure 7:
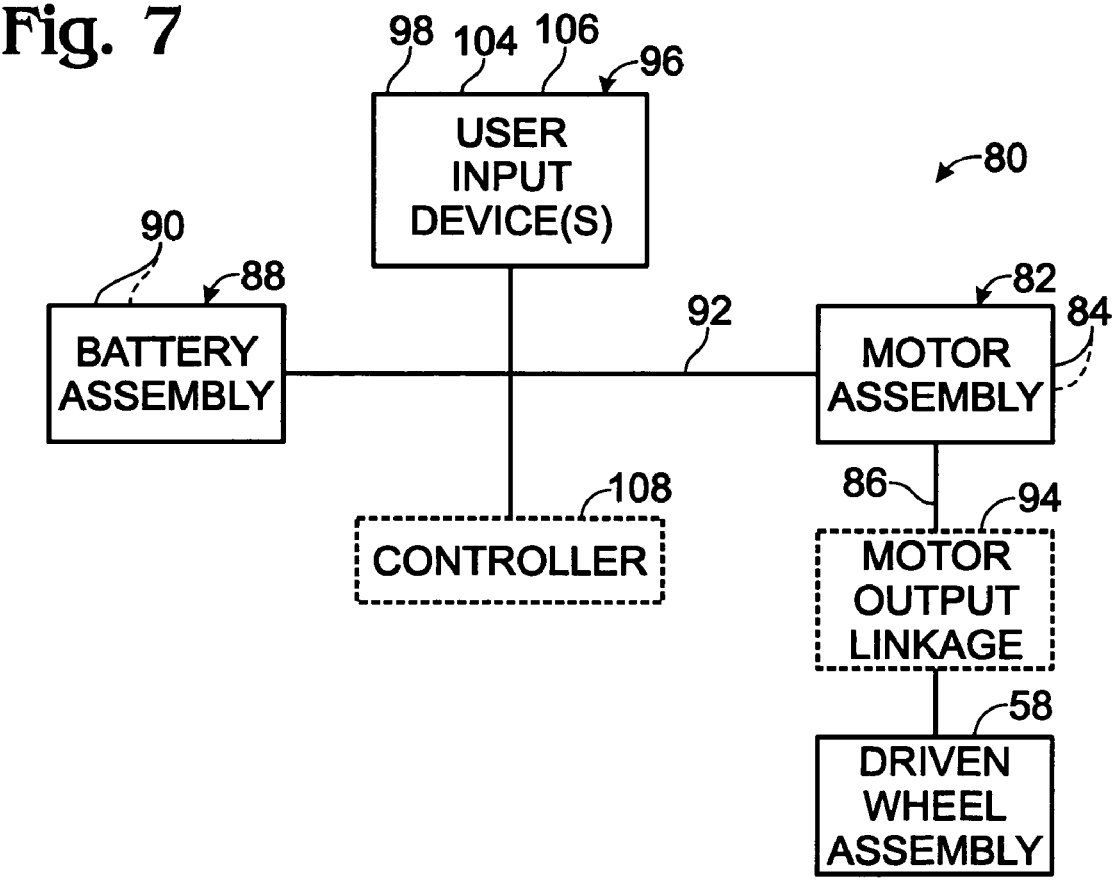
FIG. 7 is a schematic diagram of an illustrative drive assembly for children's ride-on vehicle assemblies according to the present disclosure.

As indicated at 80 in FIGS. 1 and 2, leading vehicle 12 includes a drive assembly that is adapted to drive the rotation of driven wheel assembly 58 and thereby cause ground-traveling movement of the leading vehicle and any attached trailing vehicle. In FIG. 7, an illustrative (non-exclusive) example of a suitable drive assembly 80 for a children's ride-on vehicle, such as leading vehicle 12, is schematically depicted. The illustrated drive assembly is an example of a drive assembly that includes a battery-powered motor assembly. Drive assembly 80 is adapted to drive the rotation of driven wheel assembly 58. The drive assembly includes a motor assembly 82, which includes at least one battery-powered motor 84 that is adapted to drive the rotation of at least one of the vehicle's driven wheels. The motor assembly includes at least one output 86 that provides a rotational input to the driven wheel(s). Typically, the output 86 from each of the one or more motors includes a rotating shaft and/or a rotation pinion or output gear. However, output 86 may include more than one shaft, pinion, and/or gear, such as when motor assembly 82 includes more than one motor and/or when driven wheel assembly 58 includes more than one driven wheel. Motor assembly 82 may also be configured to power other moveable components on vehicle 12, such as depending on the form of the vehicle.

Power for the motor assembly is provided by battery assembly 88. Battery assembly 88 includes at least one battery, or cell, 90 that is adapted to provide power to the motor assembly. Any suitable type and number of batteries may be used in battery assembly 88. Although not required, the batteries are typically rechargeable batteries. For example, one or more six-, twelve-, eighteen-, or twenty-four-volt batteries have proven effective. The battery assembly may be operatively connected to the motor assembly by any suitable electrical connectors, such as cables, wires, or positive and negative terminals or leads, and the like. The electrical interconnections between the components of the illustrated drive assembly 80 are schematically depicted as a wiring harness 92. Illustrative, non-exclusive examples of suitable battery assemblies are disclosed in U.S. Pat. No. 6,509,719, the complete disclosure of which is hereby incorporated by reference for all purposes.

In FIG. 7, drive assembly 80 is shown further including an optional motor output linkage 94 that mechanically interconnects the motor assembly with the driven wheel assembly. Motor output linkage 94 may be any suitable mechanism that transmits the rotational input from the motor assembly's output(s) to the driven wheel assembly. Examples of suitable linkages 94 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. Drive assembly 80 may be formed without motor output linkage 94, in which case the output(s) 86 of the motor assembly may directly transmit the rotational input to the driven wheel assembly.

Drive assembly 80 also includes one or more user input devices 96 that are adapted to convey inputs from a child sitting on the vehicle's seat, such as seat 26, to the drive assembly. User input devices 96 also may be referred to as user control devices. These devices convey a user's inputs, such as via the vehicle's wiring harness 92, and affect the actuation of the motor assembly, such as by causing the actuation (or energization) of the motor assembly, selecting between a range of electronic configurations, selecting the direction of rotation of the motor assembly's output, selecting the relative degree of a maximum rate of rotation to which the motor assembly is actuated, etc. Illustrative examples of suitable devices 96 include a drive actuator 98, through which a user input directing the battery assembly to energize the motor assembly is received. Examples of suitable drive actuators 98 include an on/off switch, a foot pedal, a throttle lever, and a rotational handgrip on a steering mechanism that includes a handlebar. In FIG. 1, an example of a drive actuator 98 is shown in the form of a foot pedal 100 positioned for actuation by a child sitting on seat 26. When the drive actuator takes a form other than a foot pedal, it may be located in any suitable location within or near passenger region 22 so that a child sitting on seat 26 may reach the actuator while positioned to operate the vehicle. For example, an on/off switch or throttle may be located on the body or on the steering mechanism, such as illustrated at 102 in FIG. 1.

Other examples of user input devices 96 include a speed switch 104, which enables a user to select the relative rate of rotation of the motor assembly's output(s) 86, and a direction switch 106, which enables a user to select the relative direction (i.e., clockwise or counterclockwise) of rotation of output(s) 86 and thereby configure the vehicle to drive in forward and reverse directions. Switches 104 and 106 may be located in any suitable location on body 20 or steering assembly 64 for actuation by a child sitting on seat 26. An example of a suitable speed switch 104 is a switch that selectively configures a pair of batteries between series and parallel configurations to define relative "high" and "low" speed configurations. Speed switch 104 may additionally or alternatively selectively configure a pair of motors between series and parallel configurations. As another example, the speed switch may communicate with a microprocessor or other controller to control the relative energization of the motor assembly, such as through pulse width modulation or other duty cycle ramping.

Drive assembly 80 may (but is not required to) further include a controller 108, which controls the operation of the drive assembly responsive to at least one of received user inputs and predetermined programming. As an illustrative example, controller 108 may be adapted to control electronically the transmission of a user-selected speed to the driven wheel assembly. Controller 108 may include a microprocessor or suitable control circuit that is adapted to control the actuation, or energization, of the motor assembly by the battery assembly to regulate electronically the rotational input transmitted by the motor assembly to the driven wheel assembly. Controller 108 may regulate at least one of the timing and the ramp, or rate, of application of the transmission of the rotational input after actuation of a corresponding user input device by a child sitting on seat 26. In other words, the controller may be configured to delay in at least time and/or rate of transmission the rotational input to the driven wheel assembly responsive at least in part to a user input selecting the desired, or selected, rotational input. An illustrative example of a suitable controller is disclosed in U.S. patent application Ser. No. 10/081,934, the complete disclosure of which is hereby incorporated by reference for all purposes.

As discussed, and as indicated schematically in FIG. 2 in dashed lines, it is within the scope of the present disclosure, but not required, that trailing vehicle 14 also may include a drive assembly 80. As also discussed, drive assembly 80 may additionally or alternatively include any other suitable structure for generating ground-traveling movement, i.e., driven rotation of the driven wheel(s). For example, the drive assembly may include a pedal assembly that is mechanically coupled to the driven wheel(s) so that the wheel(s) is/are rotationally driven as a child manipulates the pedals.

FIGS. 8 and 9 depict an example of an illustrative connection apparatus 16 in the form of a hitch assembly 18 that is adapted to interconnect leading and trailing vehicles according to the present disclosure. FIG. 8 presents hitch assembly 18 in an assembled configuration, and FIG. 9 presents an exploded view of the illustrative hitch assembly. As shown in FIGS. 8 and 9, and perhaps best seen in FIG. 9, the illustrated hitch assembly includes a hitch member 110, a housing 112, and a receiving member 114. As shown, the illustrated hitch member is retained on trailing vehicle 14 in a compartment, or chamber 142, defined between housing 112 and cover 40. In such a configuration, receiving member 114 is mounted or otherwise connected to the leading vehicle. However, it is within the scope of the present disclosure that this relationship may be reversed, with the receiving member being associated with the trailing vehicle and the hitch member being associated with the leading vehicle. In other words, the hitch member is coupled to or otherwise associated with a first one of the leading and the trailing vehicles, and the receiving member is coupled to or otherwise associated with the other of the leading and the trailing vehicles. Similarly, cover 40 is not required, and the hitch member may be selectively housed for pivotal movement relative to the body of the corresponding vehicle without being substantially, or even completely, enclosed in a compartment.

As discussed in more detail herein, the hitch assembly interconnects and enables pivotal movement of the leading vehicle and the trailing vehicle relative to each other. Pivoting of leading vehicle 12 and trailing vehicle 14 relative to each other may enhance the play value of a children's vehicle assembly, for example by facilitating the execution of a turn or other directional change while traversing a ground surface, enabling a ride-on vehicle assembly to more easily traverse an uneven ground surface, or otherwise simulating the movement of a full-sized vehicle assembly. This interconnection of the vehicles may be permanent, or fixed, in that the hitch assembly is not designed to be selectively and repeatedly disconnected to uncouple and recouple the vehicles, or the interconnection may be a selective, or releasable, interconnection, in that the hitch assembly is designed to be repeatedly disconnected and reconnected to uncouple and recouple the leading and trailing vehicles.

FIG. 10 shows the hitch member of FIGS. 8 and 9 in more detail. As shown, hitch member 110 includes a pinch-relief portion 120, which is interconnected with a linking portion 122. In FIG. 10, the pinch-relief portion and linking portion are interconnected at a ball joint, or ball portion, 124, although any other suitable structure may be used. As shown in the depicted example, pinch-relief portion 120 protrudes laterally from ball portion 124, and linking portion 122 extends downwardly from ball portion 124 such that pinch-relief portion 120 and linking portion 122 extend generally perpendicular to each other. Referring back to FIG. 9, it can be seen that the pinch-relief portion of the hitch member is enclosed within chamber 142.

Housing 112 may be integrally mounted to a vehicle body, such as trailing vehicle body 30, or formed separately and secured via any suitable method, such as screws, bolts, clips, or other fasteners. Referring again to FIG. 9, housing 112 may be seen to include one or more inner walls 140 defining interior chamber 142, which may further include a first pair of stop regions 144 disposed on the inner walls. Interior chamber 142 may optionally include additional pairs of stop regions, such as a second pair of stop regions 146. Housing 112 may also include a socket portion 148 with a generally circular socket opening 150, sized such that ball portion 124 is located in the socket opening when hitch assembly 18 is in an assembled configuration, such as that shown in FIG. 8. In such an assembled configuration, hitch member 110 may be positioned so that pinch-relief portion 120 extends within interior chamber 142, and linking portion 122 extends downwardly from housing 112. Thus, hitch member 110 may be adapted to pivot relative to housing 112 in one or more ranges of pivotal movement, wherein pivotal movement in a selected direction may be restricted when a part of hitch member 110, such as pinch-relief portion 120, engages a stop region.

Receiving member 114 may be integrally formed with a vehicle body, such as leading vehicle body 20, or it may be formed separately and secured to the vehicle body by any suitable mechanism. Receiving member 114 may have any suitable shape and/or configuration that is designed to interconnect with the hitch member to couple the leading and trailing vehicles together. In the illustrative example that is perhaps best seen in FIG. 9, receiving member 114 includes a body portion 160 through which a hollow bore, or boss, 162 extends. As shown, boss 162 has a rectangular cross-section. When the hitch assembly is connected, or coupled, the hitch member securely interlocks with receiving member 114 and is adapted to pivot relative to housing 112 in one or more ranges of pivotal movement. The pivotal movement of hitch member 110 relative to housing 112 in turn permits the leading and trailing vehicles to pivot relative to each other.

It is within the scope of the present disclosure that other configurations may be used for linking portion 122 and boss 162. For example, if boss 162 has a cylindrical configuration, the linking portion may rotate within the boss and thereby provide another mechanism for enabling pivotal movement between the leading and trailing vehicles. However, a rectangular or other non-cylindrical configuration may be preferred when it is desired to provide a hitch assembly that also provides a pinch-relief mechanism to restrict the pivotal movement of the vehicles from pinching a user's fingers or other body portions.

As mentioned above, hitch assembly 18 may be adapted to permit selective uncoupling of the leading and trailing vehicles. Also shown in FIG. 10 is a retaining mechanism 126, which is adapted to selectively retain the linking portion in a coupled configuration relative to the receiving member. In the depicted embodiment shown in FIG. 10, retaining mechanism 126 of hitch member 110 is adapted to interlock with, or otherwise securely engage, receiving member 114. When in use, retaining mechanism 126 is adapted to extend at least partially though the receiving member and includes spaced-apart projecting members, or prongs, 128, each of which includes a ridge, or detent portion, 130. Detent portions are adapted to extend sufficiently through receiving member 114 to restrict unintentional withdrawal of the projecting members from the receiving member. Prongs 128 may be formed of a material of a predetermined elasticity, or be otherwise mechanically reinforced to require a predetermined amount of compressive force to be applied before retaining mechanism 126 will disengage receiving member 114. In other embodiments, the hitch assembly may be supplied with a key-operable locking mechanism or similar device suitable to prevent unintentional uncoupling.

Figure 11:
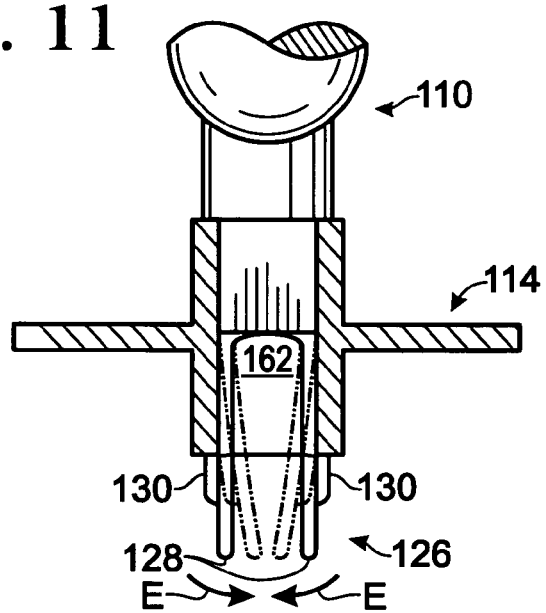
FIG. 11 is a fragmentary, cross-sectional view of the hitch member and receiving member of the hitch assembly of FIG. 8, showing in dashed lines how the retaining mechanism of the hitch member is manually operable to uncouple the hitch member from the receiving member.

FIG. 11 shows a cross-sectional view of receiving member 114 and part of hitch member 110. Retaining mechanism 126 is depicted in the form of a clip-like structure having two generally flat, downwardly-depending prongs 128 (as indicated in solid structure), each of which include a projecting ridge portion 130. In the illustrative configuration, the projecting members are urged toward each other as the projecting members are inserted into the receiving member, with the projecting members being biased to return toward their resting, or undeflected, configuration. When the detent portions extend through the receiving member, the projecting members return toward their resting configuration and withdrawal of the projecting members through the receiving member is prevented until a user manually deflects or otherwise urges the projecting members toward each other, such as indicated by arrows E, to permit the detent portions to be withdrawn through the receiving member. Thus, prongs 128 may be pressed toward each other to enable retaining mechanism 126 to disengage receiving member 114, and thus allow hitch member 110 to be removed from receiving member 114, thereby uncoupling the leading vehicle from the trailing vehicle. In a similar manner, the leading vehicle may be coupled with the trailing vehicle: linking portion 122 may be urged through hollow boss 162, which may force prongs 128 toward each other until detent portions 130 emerge from hollow boss 162 and snap outward, forming an interlock with receiving member 114.

It is within the scope of the disclosure that the hitch assembly does not include housing 112 as a separate component that is coupled to the trailing (or leading) vehicle. Preferably, the hitch member is coupled to the selected one of the vehicles such that the pinch-relief portion 120 is housed within a compartment, enclosure or other recess within which the pinch-relief portion may pivot within at least a first range of movement. Although not required, it may be desirable to substantially or even completely enclose the pinch-relief portion within a compartment or other portion of the vehicle to which it is coupled so that the pivotal movement of the pinch-relief portion itself is restricted from potentially pinching or otherwise engaging a user's body.

For example, in the illustrative configuration, hitch assembly 18 is adapted to provide only a limited range of pivotal movement of the pinch-relief portion of hitch member 110 relative to housing 112, thereby maintaining a spaced relationship between two coupled vehicle bodies by limiting the degree of their relative pivotal movement. This range of motion may be designed, with consideration of the particular shape and configuration of the vehicles in a particular embodiment, to provide at least a predetermined minimum clearance between respective portions of the vehicles that are drawn together during pivoting of the vehicles relative to each other. For example, this clearance may be selected to be less than an inch, an inch, two inches, etc. Moreover, maintaining a spaced relationship may prevent jackknifing of one vehicle with respect to the other, such as when the vehicle assembly is driven and steered in a reverse direction.

Figure 12:
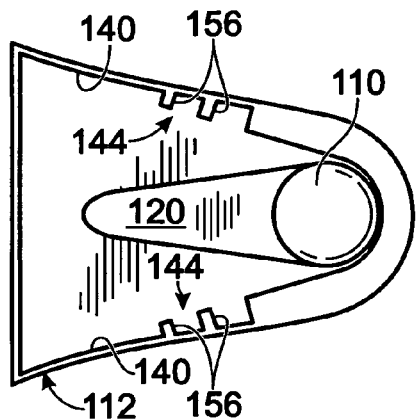
FIG. 12 is a top plan view of the hitch member and the housing of the hitch assembly of FIG. 8.
Figure 13:
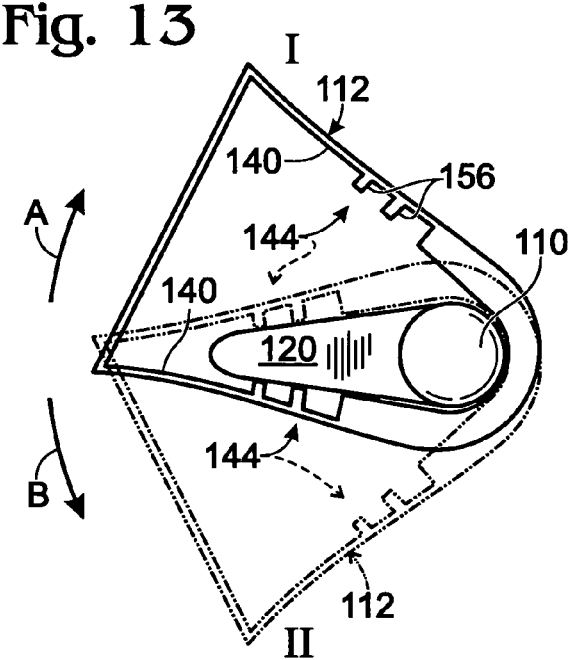
FIG. 13 is a top plan view similar to that of FIG. 12, showing a first range of pivotal movement of the housing relative to the hitch member.

An example of such pivotal movement is illustrated in FIGS. 12 and 13. FIG. 12 shows a top view of components of assembled hitch assembly 18, including hitch member 110 positioned as described above with respect to housing 112. FIG. 13 shows a similar top view and illustrates hitch member 110 pivoting about a vertical axis relative to housing 112 to define a first range of pivotal movement of the housing between a first position "I" (shown in solid structure), and a second position "II" (shown in dashed structure). In first position I, pinch-relief portion 120 is shown to abut one of the first pair of stop regions 144, restricting further pivotal movement of the housing in the direction indicated by arrow A. In second position II, pinch-relief portion 120 is shown to abut the other of stop regions 144, restricting further pivotal movement of the housing in the direction indicated by arrow B.

As shown, the first range of pivotal movement may allow limited side-to-side movement of the trailing vehicle with respect to the leading vehicle, which may facilitate execution of a turn, or other directional change, by a children's ride-on vehicle assembly traversing a ground surface. The first range of pivotal movement may also prevent a child from pinching a body part between the trailing vehicle and the leading vehicle by limiting the amount of side-to-side movement beyond the permitted range.

As illustrated in FIGS. 12 and 13, stop regions 144 may be provided with reinforcing structure such as one or more ridges, or ribs 156, which may be adapted to strengthen inner walls 140 or otherwise enhance the structural integrity of housing 112. Ribs 156 thus may enable stop regions to withstand forceful contact with pinch-relief portion 120 and more securely restrict pivotal movement of the housing beyond positions I and II, enhancing the safety of hitch assembly 18 as a pinch-relief mechanism.

Figure 14:
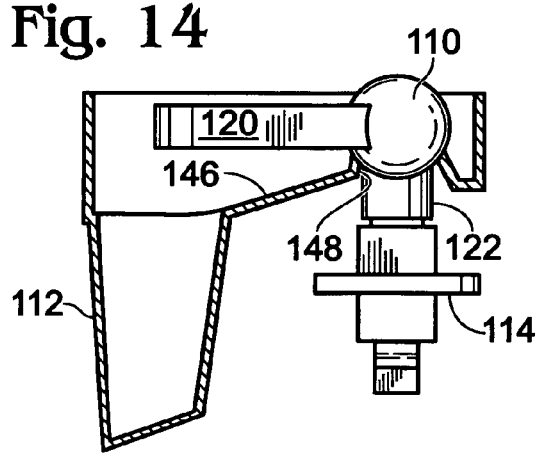
FIG. 14 is a cross-sectional side view of the hitch member, housing, and receiving member of the hitch assembly of FIG. 8.
Figure 15:
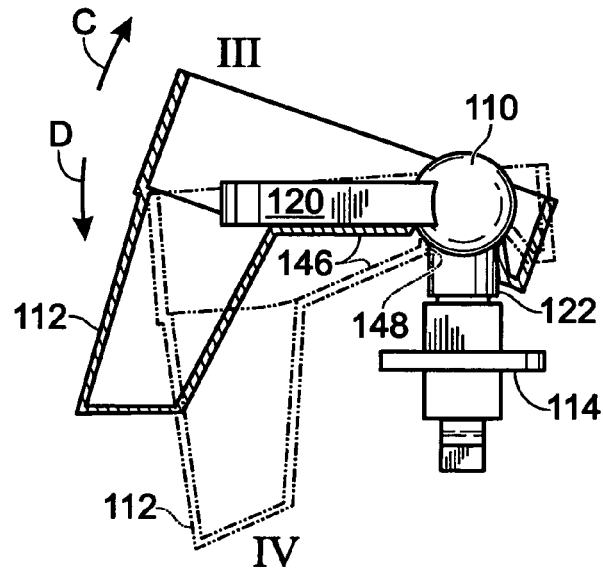
FIG. 15 is a cross-sectional side view similar to that of FIG. 14, showing a second range of pivotal movement of the housing relative to the hitch member.

FIGS. 14 and 15 illustrate another example of limited relative pivotal movement of hitch member 110 and housing 112. FIG. 14 shows a partially cross-sectional side view of components of assembled hitch assembly 18, including hitch member 110, housing 112, and receiving member 114. FIG. 15 shows a similar side view and illustrates hitch member 110 pivoting about a horizontal axis relative to housing 112 to define a second range of pivotal movement of the housing between a third position "III" (shown in solid structure), and a fourth position "IV" (shown in dashed structure). In third position III, pinch-relief portion 120 is shown to abut one of second pair of stop regions 146, restricting further pivotal movement of the housing in the direction indicated by arrow C. In fourth position IV, linking portion 122 is shown to abut the other of stop regions 146, disposed on socket portion 148, restricting further pivotal movement of the housing in the direction indicated by arrow D.

As shown, the second range of pivotal movement may allow limited up-and-down movement of the trailing vehicle with respect to the leading vehicle, which may facilitate or permit a children's ride-on vehicle assembly to traverse an uneven ground surface, such as could result in the leading vehicle's driven wheels being elevated above a ground surface and thereby unable to drive the ground-traveling movement of the vehicle assembly over the uneven ground surface. Similar to the first range of pivotal movement, the second range may also prevent a child from pinching a body part between the trailing vehicle and the leading vehicle by limiting the amount of up-and-down movement beyond the permitted range.

As illustrated in FIGS. 14 and 15, stop regions 146 may be disposed such that both pinch-relief portion 120 and linking portion 122 abut the stop regions to limit pivotal movement in a selected direction: pinch-relief portion 120 engages stop region 146 on "bottom" inner wall 140 to restrict further "downward" pivoting (in direction C), and linking portion 122 engages stop region 146 on socket portion 148 to restrict further "upward" pivoting (in direction D).

In some embodiments, including that illustrated in FIGS. 14 and 15, one or both of stop regions 146 may be provided with reinforcing structure such as ridges or ribs to further enhance the safety of hitch assembly 18 as a pinch-relief mechanism. In some embodiments, housing 112 may be provided with a cover and/or another inner wall, which may provide a surface upon which an additional stop region may be disposed. In such embodiments, pivotal movement in the direction indicated by arrow D in FIG. 15 might also be restricted, or the limiting of movement by linking portion 122 simultaneously engaging the stop region on socket portion 148 may be augmented, when pinch-relief portion 120 engages the cover or additional wall.

The components of hitch assembly 18 may be modified to allow a greater or lesser range of relative pivotal motion of the coupled vehicles, as desired. Moreover, different configurations of components of a hitch assembly, and/or the manner in which such components are assembled, may allow greater or fewer ranges of relative motion of vehicles coupled via the hitch assembly.

Also, the two ranges of pivotal movement indicated in the illustrated embodiments are shown to be substantially perpendicular to each other, but the hitch assembly may be configured to allow movement in both ranges simultaneously. For example, with reference to FIGS. 12–15, it can be seen that if housing 112 is in position "I" or "II" or at any point therebetween in the indicated range of "side-to-side" movement with respect to hitch member 110, housing 112 may also pivot up or down in the directions indicated by arrows C, D with respect to hitch member 110. However, other embodiments of hitch assembly 18 may be configured to allow relative pivotal movement of components in only one range at a time, or may be configured to allow simultaneous relative pivotal movement in two or more of a plurality of ranges. These and all such variations in the configuration of hitch assembly 18, or the components thereof, are intended to be within the scope of this disclosure.

Figure 16:
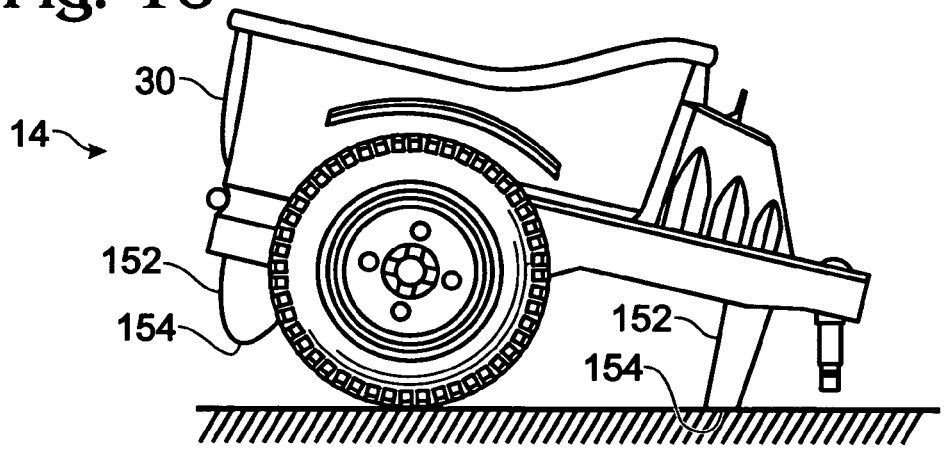
FIG. 16 is a side view of the trailing vehicle of the children's ride-on vehicle assembly of FIG. 1, showing a bracing member stabilizing the trailing vehicle in a forward direction with respect to a ground surface.
Figure 17:
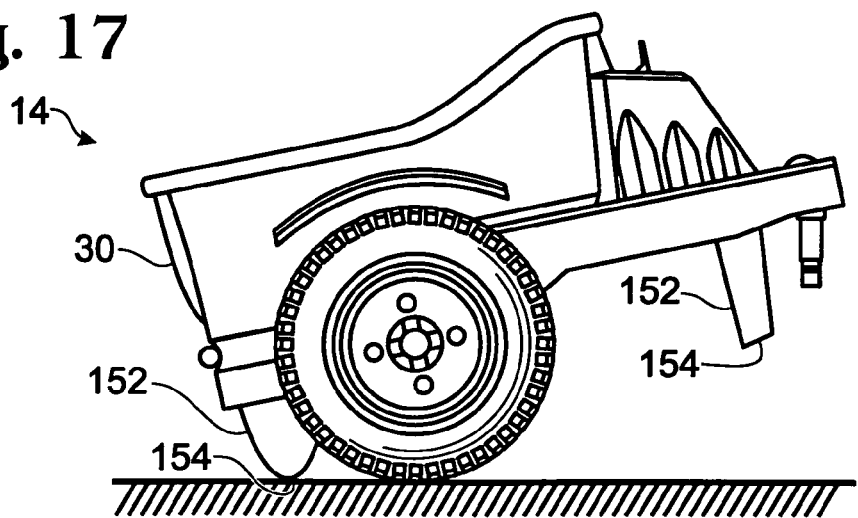
FIG. 17 is a side view of the trailing vehicle of the children's ride-on vehicle assembly of FIG. 1, showing a bracing member stabilizing the trailing vehicle in a rearward direction with respect to a ground surface.

Trailing vehicle 14 and/or hitch assembly 18 may further include at least one bracing member 152 disposed to extend downwardly from the trailing vehicle and/or hitch assembly to restrict ground-traveling sliding or other movement of the trailing vehicle if the trailing vehicle is uncoupled from the leading vehicle. The bracing member(s) may additionally or alternatively be adapted to support the uncoupled trailing vehicle in a generally horizontal configuration (i.e., to limit the angle of the trailing vehicle's bed and/or seat relative to horizontal ground surface. This supporting function may be helpful in assisting a child passenger to get into and/or out of the vehicle. FIGS. 16 and 17 illustrate a trailing vehicle with at least one forward and rearward bracing member, although it is within the scope of the present disclosure that the trailing vehicle may include only a single bracing member, or no bracing member at all. As shown in FIG. 16, the forward bracing member 152 may be sized or otherwise configured to prevent engagement of the ground surface by the hitch member, which could be damaged with such contact.

If uncoupled from a leading vehicle, bracing member 152 may be adapted to restrict tilting of trailing vehicle 14, or otherwise stabilize the trailing vehicle, with respect to the ground surface when the trailing vehicle is uncoupled from the leading vehicle. For example, in FIGS. 16 and 17, bracing members 152 are shown engaging a ground surface when trailing vehicle 14 is uncoupled from a leading vehicle, retaining trailing vehicle body 30 in a relatively horizontal orientation, or otherwise limiting the degree to which trailing vehicle body 30 moves from being in a coupled configuration, with respect to the ground surface. The bracing member(s) may include an anti-skid portion 154, such as textured or otherwise configured ground-contacting surface that is adapted to restrict sliding of the vehicle along the ground surface. Anti-skid portion 154 may be configured to prevent or restrict movement of the trailing vehicle with respect to a ground surface, for example if anti-skid portion 154 has a relatively large surface area and/or is provided with or fabricated from a material with a high coefficient of friction.

While illustrative examples of hitch assemblies according to the present disclosure have been illustrated in FIGS. 8–17, the hitch assemblies may take a wide variety of other forms, as desired or beneficial for a particular application, without departing from the scope of the present disclosure.

INDUSTRIAL APPLICABILITY

The present disclosure is applicable to children's ride-on vehicles, and especially to children's ride-on vehicle assemblies that include a leading vehicle and a trailing vehicle.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and subcombinations of features, functions, elements and/or properties that may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A children's ride-on vehicle assembly, comprising:
   a leading vehicle, comprising:
      a leading vehicle body having a seat sized for a child;
      a drive assembly adapted to selectively propel the leading vehicle along a ground surface; and
      a first plurality of wheels rotatably coupled to the leading vehicle body, wherein the first plurality of wheels includes at least one driven wheel adapted to be rotationally driven by the drive assembly;
   a trailing vehicle, comprising:
      a trailing vehicle body;
      a second plurality of wheels rotatably coupled to the trailing vehicle body; and
   a hitch assembly adapted to couple the leading vehicle for pivotal movement with the trailing vehicle, the hitch assembly comprising:
      a receiving member on a first one of the leading vehicle body and the trailing vehicle body;
      a housing on a second one of the leading vehicle body and the trailing vehicle body, the housing defining an interior chamber including a pair of spaced-apart stop regions; and
      a hitch member, comprising:
         a linking portion adapted to interlock with the receiving member; and
         a pinch-relief portion extending within the interior chamber and adapted to selectively engage each of the pair of stop regions;
   wherein the housing is adapted to pivot relative to the receiving member in a first range of pivotal movement, wherein pivotal movement in a selected direction is restricted when the pinch-relief portion engages a corresponding one of the pair of stop regions.

2. The children's ride-on vehicle assembly of claim 1, wherein the drive assembly comprises a motor assembly adapted to drive the rotation of the at least one driven wheel and a battery assembly adapted to provide power to the motor assembly.

3. The children's ride-on vehicle assembly of claim 1, further comprising a steering assembly adapted to receive steering inputs from a child sitting on the seat.

4. The children's ride-on vehicle assembly of claim 3, wherein the first plurality of wheels includes at least one steerable wheel adapted to receive steering inputs from the steering assembly.

5. The children's ride-on vehicle assembly of claim 1, wherein the hitch assembly is adapted to enable pivotal movement of the housing relative to the receiving member in a second range of pivotal movement transverse to the first range of pivotal movement.

6. The children's ride-on vehicle assembly of claim 5, wherein the second range of pivotal movement extends at least substantially perpendicular to the first range of pivotal movement.

7. The children's ride-on vehicle assembly of claim 5, wherein the interior chamber includes a second pair of spaced-apart stop regions, and wherein pivotal movement in the second range of pivotal movement is restricted when the pinch-relief portion engages either of the second pair of stop regions.

8. The children's ride-on vehicle assembly of claim 7, wherein the hitch member further includes a ball portion interconnecting the linking portion with the pinch-relief portion; and wherein the housing further includes a socket portion adapted to receive the ball portion such that the ball portion and the pinch-relief portion are retained substantially within the interior chamber and the linking portion extends from the interior chamber through the socket portion.

9. The children's ride-on vehicle assembly of claim 8, wherein the interior chamber includes a bottom inner surface; wherein a first one of the second pair of stop regions is disposed on the bottom inner surface and a second one of the second pair of stop regions is disposed on the socket portion.

10. The children's ride-on vehicle assembly of claim 1, wherein the interior chamber includes at least one inner wall and wherein the first pair of stop regions are spaced apart from each other and disposed on the at least one inner wall.

11. The children's ride-on vehicle assembly of claim 1, wherein the pinch-relief portion is enclosed within the interior chamber.

12. The children's ride-on vehicle assembly of claim 1, wherein the hitch assembly is adapted to permit selective uncoupling of the leading vehicle body from the trailing vehicle body.

13. The children's ride-on vehicle assembly of claim 12, wherein the linking portion includes a retaining mechanism adapted to prevent unintentional uncoupling of the hitch member from the receiving member.

14. The children's ride-on vehicle assembly of claim 13, wherein the retaining mechanism includes a clip.

15. The children's ride-on vehicle assembly of claim 13, wherein the retaining mechanism is manually operable to uncouple the linking portion from the receiving member.

16. The children's ride-on vehicle assembly of claim 1, wherein the trailing vehicle further comprises at least one bracing member extending generally downward from the trailing vehicle body and adapted to restrict tilting of the trailing vehicle body with respect to the ground surface when the trailing vehicle is uncoupled from the leading vehicle.

17. The children's ride-on vehicle assembly of claim 16, wherein the housing is on the trailing vehicle body and wherein the bracing member extends from the housing.

18. The children's ride-on vehicle assembly of claim 16, wherein the hitch assembly includes at least one wheel on an axle, and the trailing vehicle comprises a first bracing member extending forward of the axle, and a second bracing member extending rearward of the axle.

19. The children's ride-on vehicle assembly of claim 16, wherein the at least one bracing member is further adapted to restrict movement of the trailing vehicle with respect to the ground surface when the trailing vehicle is uncoupled from the leading vehicle.

20. The children's ride-on vehicle assembly of claim 1, wherein the trailing vehicle body further includes a seat sized for a child.

21. The children's ride-on vehicle assembly of claim 1, wherein the trailing vehicle body further includes a bed adapted to carry a load.

22. The children's ride-on vehicle assembly of claim 21, wherein the bed is further adapted to pivot relative to the trailing vehicle body between a first position in which the bed is supported against the trailing vehicle body and a second position in which the bed is inclined with respect to the first position.

23. A trailing vehicle assembly for use with a children's ride-on vehicle, the assembly comprising:
 a trailing vehicle, comprising:
  a trailing vehicle body; and
  a plurality of wheels rotatably coupled to the trailing vehicle body; and
 a hitch assembly adapted to couple the trailing vehicle with an independently operable children's ride-on vehicle, the hitch assembly comprising:
  a receiving member adapted to be mounted on the children's ride-on vehicle;
  a housing on the trailing vehicle body, the housing defining an interior chamber having a pair of spaced-apart stop regions; and
  a hitch member, comprising:
   a linking portion adapted to interlock with the receiving member; and
   a pinch-relief portion adapted to fit substantially within the interior chamber and to selectively engage the stop regions;
 wherein the housing is adapted to pivot relative to the receiving member in a first range of pivotal movement, wherein pivotal movement in a selected direction is restricted when the pinch-relief portion engages a corresponding stop region.

24. The trailing vehicle assembly of claim 23, wherein the hitch assembly is adapted to enable pivotal movement of the housing relative to the receiving member in a second range of pivotal movement transverse to the first range of pivotal movement.

25. The trailing vehicle assembly of claim 24, wherein the second range of pivotal movement extends at least substantially perpendicular to the first range of pivotal movement.

26. The trailing vehicle assembly of claim 24, wherein the interior chamber includes a second pair of spaced-apart stop regions, and wherein pivotal movement in the second range of pivotal movement is restricted when the pinch-relief portion engages either of the second pair of stop regions.

27. The trailing vehicle assembly of claim 26, wherein the hitch member further includes a ball portion interconnecting the linking portion with the pinch-relief portion; and wherein the housing further includes a socket portion adapted to receive the ball portion such that the ball portion and the pinch-relief portion are retained substantially within the interior chamber and the linking portion extends from the interior chamber through the socket portion.

28. The trailing vehicle assembly of claim 27, wherein the interior chamber includes a bottom inner surface; wherein a first one of the second pair of stop regions is disposed on the bottom inner surface and a second one of the second pair of stop regions is disposed on the socket portion.

29. The trailing vehicle assembly of claim 23, wherein the interior chamber includes at least one inner wall and wherein the first pair of stop regions are spaced apart from each other and disposed on the at least one inner wall.

30. The trailing vehicle assembly of claim 23, wherein the pinch-relief portion is enclosed within the interior chamber.

31. The trailing vehicle assembly of claim 23, wherein the hitch assembly is adapted to permit selective uncoupling of the leading vehicle body from the trailing vehicle body.

32. The trailing vehicle assembly of claim 31, wherein the linking portion includes a retaining mechanism adapted to prevent unintentional uncoupling of the hitch member from the receiving member.

33. The trailing vehicle assembly of claim 32, wherein the retaining mechanism includes a clip.

34. The trailing vehicle assembly of claim 32, wherein the retaining mechanism is manually operable to uncouple the linking portion from the receiving member.

35. The trailing vehicle assembly of claim 23, wherein the trailing vehicle further comprises at least one bracing member extending generally downward from the trailing vehicle body and adapted to restrict tilting of the trailing vehicle body with respect to a ground surface when the trailing vehicle is uncoupled from a leading vehicle.

36. The trailing vehicle assembly of claim 35, wherein the housing is on the trailing vehicle body and wherein the at least one bracing member extends from the housing.

37. The trailing vehicle assembly of claim 35, wherein the hitch assembly includes at least one wheel on an axle, and the trailing vehicle comprises a first bracing member extending forward of the axle, and a second bracing member extending rearward of the axle.

38. The trailing vehicle assembly of claim 35, wherein the at least one bracing member is further adapted to restrict movement of the trailing vehicle with respect to the ground surface when the trailing vehicle is uncoupled from a leading vehicle.

39. The trailing vehicle assembly of claim 23, wherein the trailing vehicle body further includes a seat sized for a child.

40. The trailing vehicle assembly of claim 23, wherein the trailing vehicle body further includes a bed adapted to carry a load.

41. The trailing vehicle assembly of claim 40, wherein the bed is further adapted to pivot relative to the trailing vehicle body between a first position in which the bed is supported against the trailing vehicle body and a second position in which the bed is inclined with respect to the first position.

* * * * *